(12) United States Patent
Rogers et al.

(10) Patent No.: US 9,879,780 B2
(45) Date of Patent: Jan. 30, 2018

(54) SLIDING SEAL

(71) Applicant: United Technologies Corporation, Farmington, CT (US)

(72) Inventors: Mark J. Rogers, Kennebunk, ME (US); Timothy M. Davis, Kennebunk, ME (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 22 days.

(21) Appl. No.: 14/921,554

(22) Filed: Oct. 23, 2015

(65) Prior Publication Data

US 2016/0201494 A1 Jul. 14, 2016

Related U.S. Application Data

(60) Provisional application No. 62/068,545, filed on Oct. 24, 2014.

(51) Int. Cl.
*F01D 11/00* (2006.01)
*F16J 15/08* (2006.01)
(Continued)

(52) U.S. Cl.
CPC ......... *F16J 15/0887* (2013.01); *F01D 11/005* (2013.01); *F01D 25/246* (2013.01); *F16J 15/067* (2013.01); *F16J 15/0806* (2013.01); *F16J 15/104* (2013.01); *F16J 15/3452* (2013.01); *F05D 2220/32* (2013.01); *F05D 2240/55* (2013.01); *F05D 2250/184* (2013.01); *Y02T 50/672* (2013.01)

(58) Field of Classification Search
CPC ...... F16J 15/061; F16J 15/0887; F16J 15/106; F16J 15/064; F16J 15/128; F16J 15/122; F01D 11/005
See application file for complete search history.

(56) References Cited

U.S. PATENT DOCUMENTS 4,783,085 A 11/1988 Wicks et al.
5,014,917 A 5/1991 Sirocky et al.
(Continued)

FOREIGN PATENT DOCUMENTS

DE 1790256 U 6/1959
DE 19646527 A1 4/1998
(Continued)

OTHER PUBLICATIONS

English Abstract for EP2551463A1—Jan. 30, 2013; 1 pg.
(Continued)

*Primary Examiner* — Gilbert Lee
(74) *Attorney, Agent, or Firm* — Cantor Colburn LLP

(57) ABSTRACT

The present disclosure relates generally to a sliding seal between two components. The sliding seal includes a carrier having one or more cavities formed therein. The one or more carriers may contain wave springs and/or compliant seals therein. Various embodiments provide loading of the seal in both the axial and radial directions, regardless of whether a pressure differential exists across the seal, by means of springs and/or ramped surfaces. Other combinations of carrier, wave springs, and compliant seals are also disclosed.

19 Claims, 13 Drawing Sheets

(51) Int. Cl.
  *F16J 15/06*    (2006.01)
  *F16J 15/10*    (2006.01)
  *F16J 15/34*    (2006.01)
  *F01D 25/24*    (2006.01)

(56) References Cited

U.S. PATENT DOCUMENTS

| | | | |
|---|---|---|---|
| 5,078,412 A * | 1/1992 | Baumgarth | F02K 1/805 239/127.1 |
| 5,158,305 A * | 10/1992 | Halling | F16L 17/06 277/591 |
| 6,702,549 B2 * | 3/2004 | Tiemann | F01D 5/22 277/630 |
| 7,121,790 B2 | 10/2006 | Fokine et al. | |
| 7,347,425 B2 | 3/2008 | James | |
| 8,651,497 B2 | 2/2014 | Tholen et al. | |
| 2004/0017045 A1 * | 1/2004 | Cross | F02K 1/004 277/377 |
| 2009/0243228 A1 | 10/2009 | Heinemann et al. | |
| 2012/0319362 A1 * | 12/2012 | Tholen | F01D 11/005 277/644 |
| 2013/0074338 A1 * | 3/2013 | Swensen | F01D 11/005 29/889.22 |
| 2013/0113168 A1 | 5/2013 | Lutjen et al. | |
| 2015/0102566 A1 * | 4/2015 | Hanumanthan | F01D 11/005 277/591 |

FOREIGN PATENT DOCUMENTS

EP    2551463 A1    1/2013
WO    2014169120 A1    10/2014

OTHER PUBLICATIONS

English Abstract/Translation for DE1790256U—Jun. 11, 1959; 3 pgs.
English Abstract/Translation for DE19646527A1—Apr. 30, 1998 (also published as EP0840040A2—May 6, 1998); 6 pgs.
European Search Report for Application No. 15191545.1-1751; Date of Mailing: Mar. 2, 2016; 8 pgs.

* cited by examiner

SLIDING SEAL

CROSS REFERENCE TO RELATED APPLICATIONS

This application claims the benefit of U.S. Provisional Patent Application Ser. No. 62/068,545 filed on Oct. 24, 2014, the contents of which are incorporated herein by reference thereto.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second adjacent components disposed about a centerline is disclosed, the seal comprising: a carrier, comprising: an inboard carrier surface; an outboard carrier surface disposed radially outboard from the inboard carrier surface; a forward carrier surface; an aft carrier surface; and a first cavity disposed in one of the outboard carrier surface, the forward carrier surface, and the aft carrier surface; and a wave spring at least partially disposed in the first cavity and extending between the carrier and the first component and operative to bias the carrier toward the first component.

In a further embodiment of the above, the carrier is split at one circumferential location.

In a further embodiment of any of the above, a second cavity is disposed in the forward carrier surface; and a first compliant seal is at least partially disposed in the second cavity and extending between the carrier and the first component.

In a further embodiment of any of the above, the first compliant seal comprises one of a woven ceramic rope seal, a braided ceramic rope seal, and a ceramic textile.

In a further embodiment of any of the above, an inner diameter of the carrier in a free state is less than an outer diameter of the space.

In a further embodiment of any of the above, a second compliant seal is disposed between the inboard carrier surface and the second component.

In a further embodiment of any of the above, the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

In a further embodiment of any of the above, the forward carrier surface is at least partially radiused.

In a further embodiment of any of the above, the inboard carrier surface comprises a first circumferential protrusion in contact with the second component.

In a further embodiment of any of the above, a second compliant seal is disposed between the inboard carrier surface and the second component; and a third compliant seal is disposed between the forward carrier surface and the first component.

In a further embodiment of any of the above, the first cavity is disposed in the outboard carrier surface; and the wave spring radially biases the carrier.

In a further embodiment of any of the above, the second component includes a ramped first surface that forms an angle of less than 90 degrees with a second surface of the first component.

In a further embodiment of any of the above, a second compliant seal is disposed between the inboard carrier surface and the ramped first surface; and a third compliant seal is disposed between the forward carrier surface and the first component.

In a further embodiment of any of the above, the first component includes a ramped first surface that forms an angle of less than 90 degrees with a second surface of the second component; and the forward carrier surface is in contact with the ramped first surface.

In a further embodiment of any of the above, the first component includes a ramped first surface that forms an angle of less than 90 degrees with a second surface of the second component, the seal further comprising: a second compliant seal disposed between the inboard carrier surface and the second component; and a third compliant seal disposed between the forward carrier surface and the ramped first surface.

In a further embodiment of any of the above, the second component includes a frustoconical component surface that extends both axially and radially; the outboard carrier surface comprises a frustoconical carrier surface that extends both axially and radially; the first cavity is disposed in the frustoconical carrier surface; the wave spring extends between the first cavity and the frustoconical component surface; the wave spring axially loads the carrier against the first component; and the wave spring radially loads the carrier against the second component.

In a further embodiment of any of the above, a second compliant seal is disposed between the inboard carrier surface and the second component; and a third compliant seal is disposed between the forward carrier surface and the first component.

In another embodiment, a system is disclosed, comprising: a first component including a first surface; a second component including a second surface, the second component disposed adjacent the first component and defining a seal cavity therebetween; wherein the first and second components are disposed about an axial centerline; and a seal disposed in the seal cavity, the seal including: a carrier, comprising: an inboard carrier surface; an outboard carrier surface disposed radially outboard from the inboard carrier surface; a forward carrier surface; an aft carrier surface; and a first cavity disposed in one of the outboard carrier surface, the forward carrier surface, and the aft carrier surface; and a wave spring at least partially disposed in the first cavity and extending between the carrier and the first component and operative to bias the carrier toward the first component.

In a further embodiment of any of the above, a second cavity is disposed in the forward carrier surface; and a first compliant seal at least partially disposed in the second cavity and extending between the carrier and the first component.

In a further embodiment of any of the above, the forward carrier surface is at least partially radiused.

In a further embodiment of any of the above, the second component includes a frustoconical component surface that extends both axially and radially; the outboard carrier surface comprises a frustoconical carrier surface that extends both axially and radially; the first cavity is disposed in the frustoconical carrier surface; the wave spring extends between the first cavity and the frustoconical component surface; the wave spring axially loads the carrier against the first component; and the wave spring radially loads the carrier against the second component.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
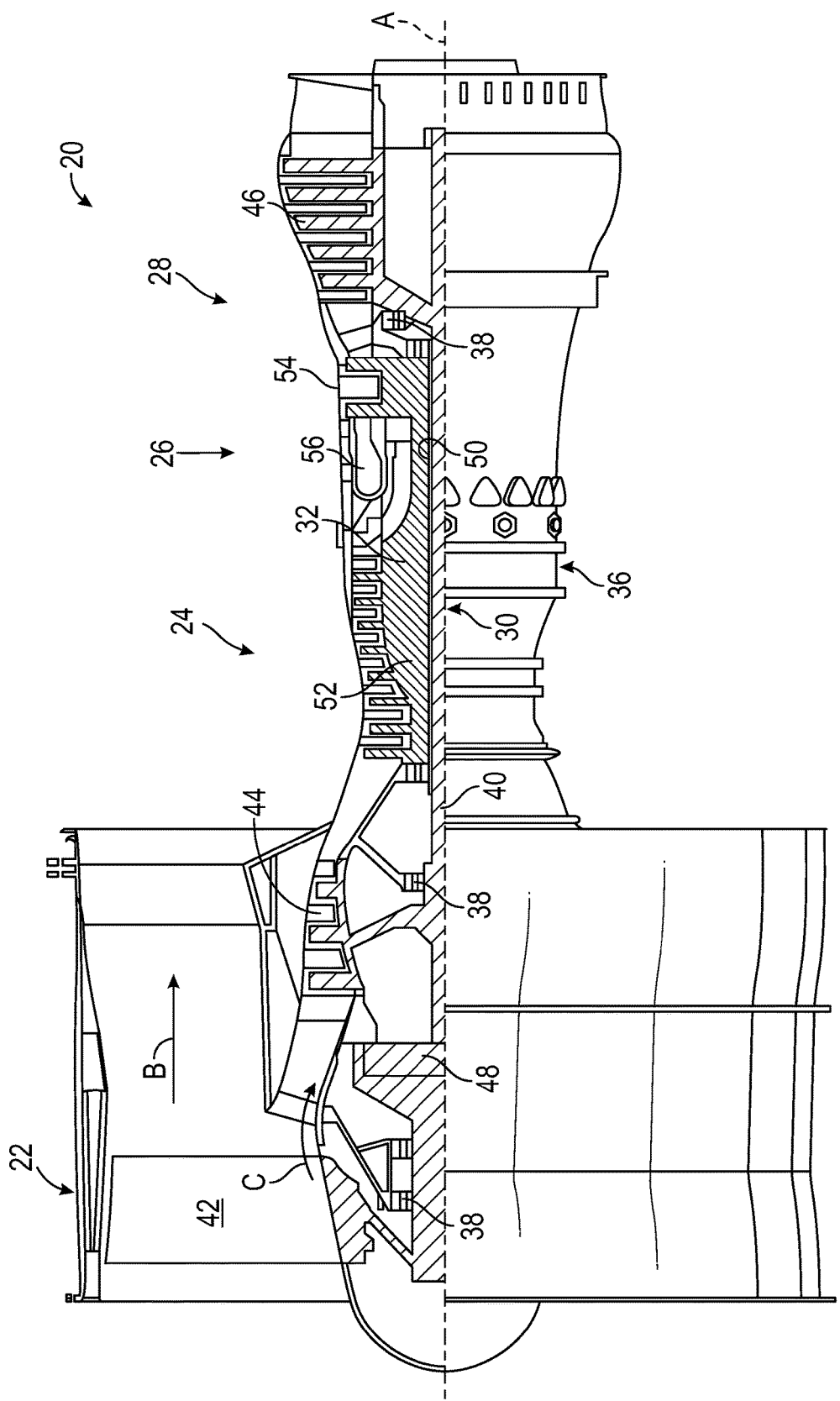
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
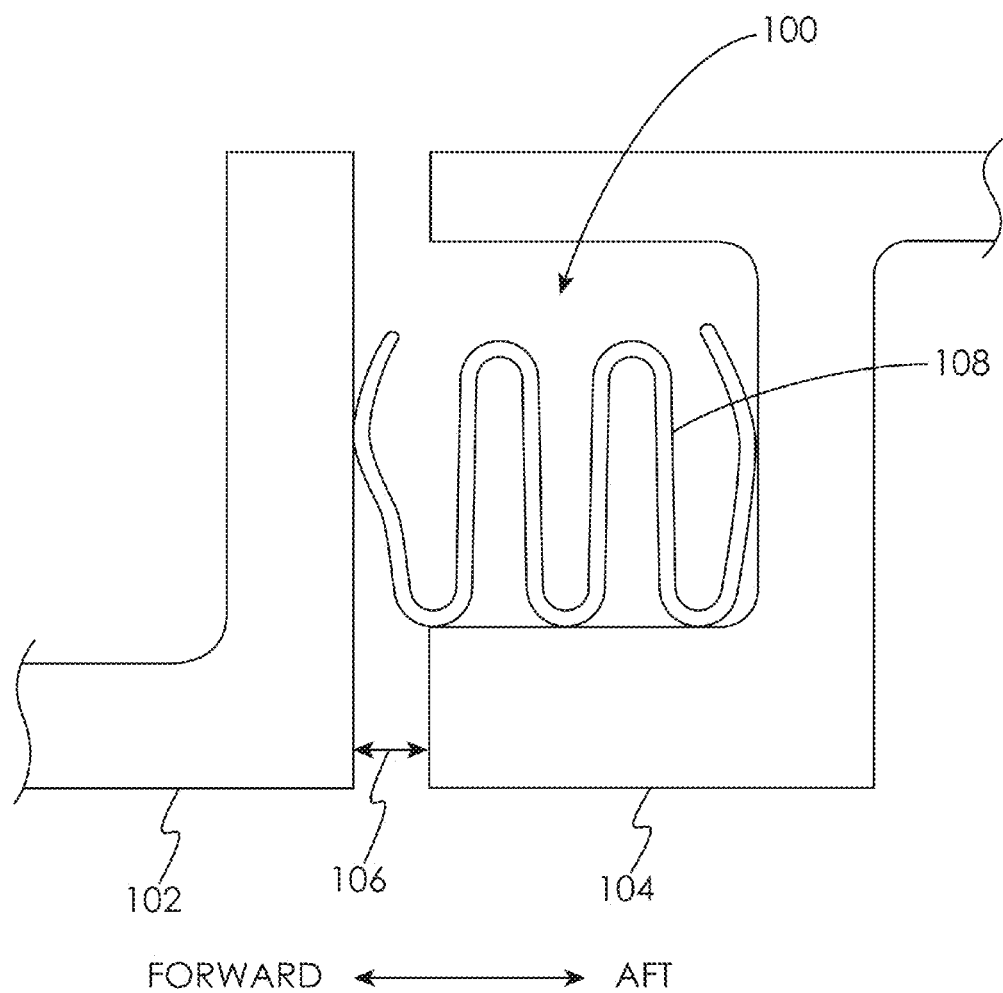
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
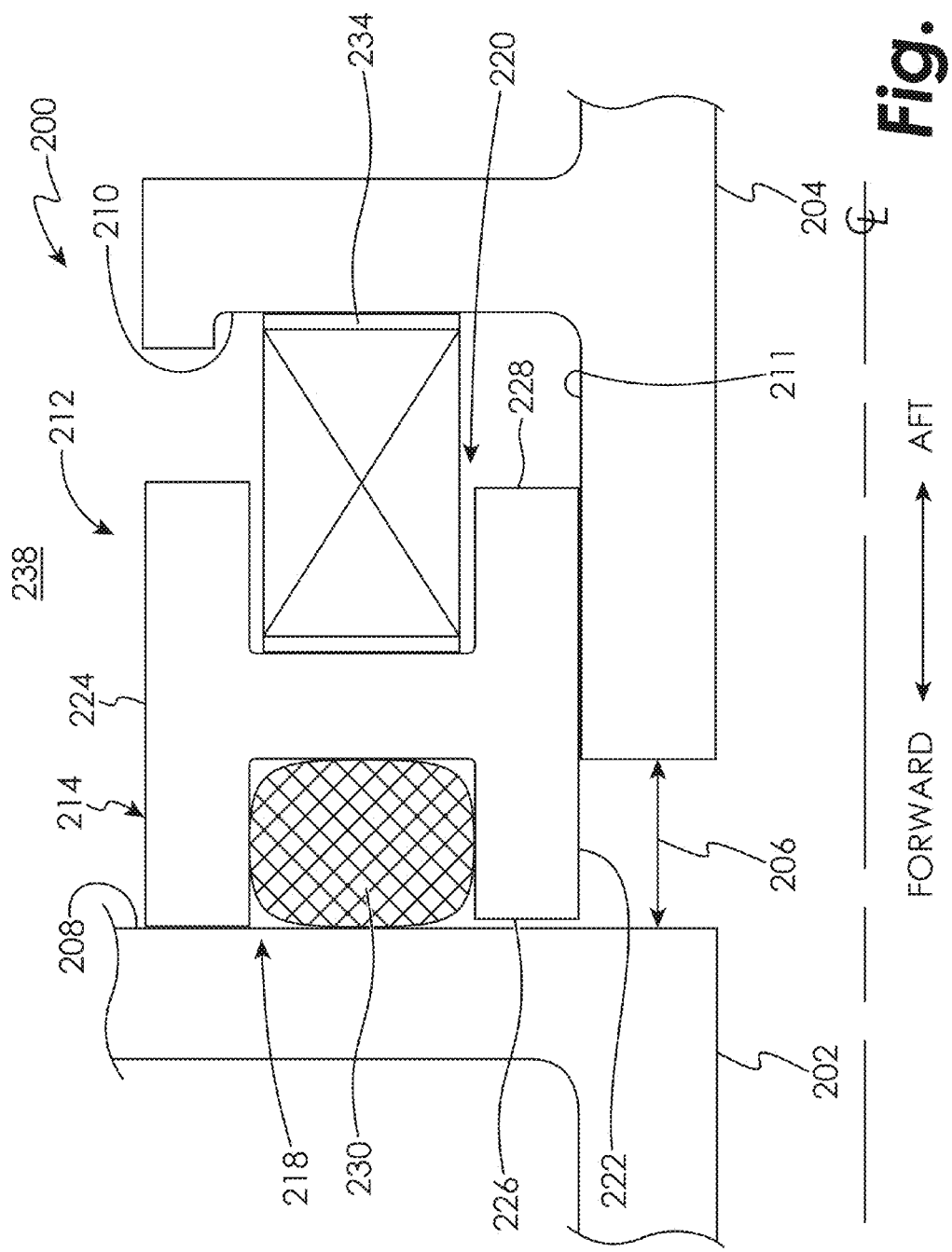
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 208 facing the seal cavity 200 and component 204 includes surfaces 210 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples. The seal 212 is formed from a split hoop carrier 214 that is split at one circumferential location in an embodiment. The carrier 214 is generally H-shaped and includes a cavity 218 and a cavity 220 formed therein. The cavity 218 and the cavity 220 are each formed in radial surfaces of the carrier 214 between inboard carrier surface 222 and outboard carrier surface 224. The cavity 218 is formed in a forward carrier surface 226, while the cavity 220 is formed in an aft carrier surface 228 in an embodiment. The radially outboard portion of the forward carrier surface 226 may touch the surface 208 of component 202 in an embodiment to create an additional restriction to the leakage of gas past the forward surface of the seal. The seal 212 may include a coating and/or a sheath to provide increased wear resistance.

Figure 4:
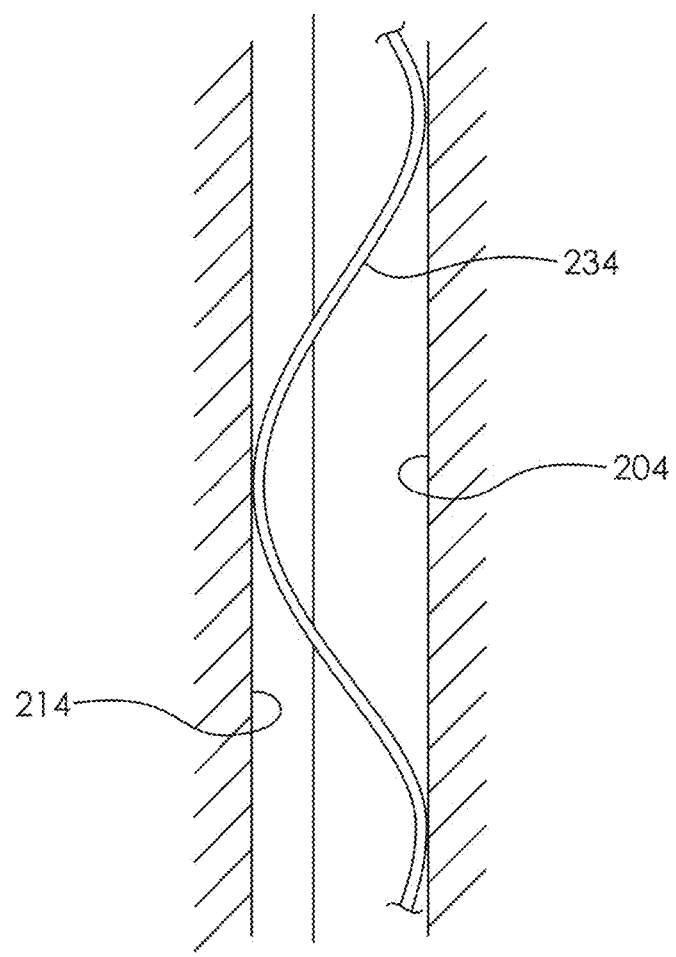
FIG. 4 is a schematic plan view of a wave spring in an embodiment.

The seal 212 may include a full hoop high-temperature and compliant seal 230, such as a woven or braided ceramic rope seal or flat fabric (for example, NEXTEL ceramic textile available from The 3M Company of Maplewood, Minn. USA, to name just one non-limiting example) to partially seal stair-stepped gaps typical of segmented part interfaces of the component 202. The cavity 218 of the carrier 214 mechanically traps the compliant seal 230 while exposing enough of the compliant seal 230 to allow it to conform to the surface 208 of the component 202. A split hoop wave spring 234 may be partially disposed within the cavity 220 and extend axially between the carrier 214 and the component 204. A plan view of a portion of the wave spring 234 is illustrated in FIG. 4.

Pressure in a secondary flow cavity 238 is transmitted to the seal cavity 200 through an opening defined by the components 202, 204. This pressure acts upon the surfaces of the carrier 214, thereby loading the carrier 214 axially forward and radially inward and causing the inboard carrier surface 222 to seat against the surface 211 of the component 204 and the compliant seal 230 to seat against the surface 208 of the component 202. The wave spring 234, acting on the surface 210 of component 204, provides further forward loading of the carrier 214 to maintain contact between the compliant seal 230 and the surface 208 of component 202 and between the radially outboard portion of the forward carrier surface 226 and the surface 208 of component 202 in an embodiment. These loading forces prevent most or all of the secondary flow cavity 238 gases from reaching the design clearance 206 area and flow path. As the two components 202 and 204 move relative to each other in the axial and/or radial direction, the carrier 214 is free to slide relative to the components 202, 204 in the axial and circumferential directions while the pressure forces acting upon the surfaces of the carrier 214 load the seal 212 so that it remains in contact with both components 202 and 204 as shown. Therefore, sealing is maintained while the components 202 and 204 and the seal 212 move relative to one another.

Because the carrier 214 slides with respect to the components 202, 204, the seal 212 is not substantially deflected by the relative movement between the components 202 and 204. Because of the design of the carrier 214, the seal 212 is relatively stiff (i.e., has a high moment of inertia), which enables the seal 212 to resist rolling (i.e., rotating clockwise or counter-clockwise in the view of FIG. 3). The stiffness of the seal 212 also enables it to be preloaded radially inward by sizing its inner diameter in the free state to be smaller than the diameter of the seal cavity 200, thus providing additional inward load against the surface 211. Additionally, the substantial thickness of the carrier 214 enables the seal 212 to exhibit high wear tolerance.

Furthermore, the wave spring 234 pushes the carrier 214 to remain in contact with the forward wall 208 when the cavity 200 is not pressurized, such as during engine start-up, for example. This prevents the seal 212 from being damaged during transportation and installation, and also ensures that the seal 212 is instantly and positively pressurized/pressure-energized at engine start-up. Leakage can be reduced significantly at the split location of carrier 214 by adding a sliding bridge to the cover the gap in the carrier 214.

Figure 5:
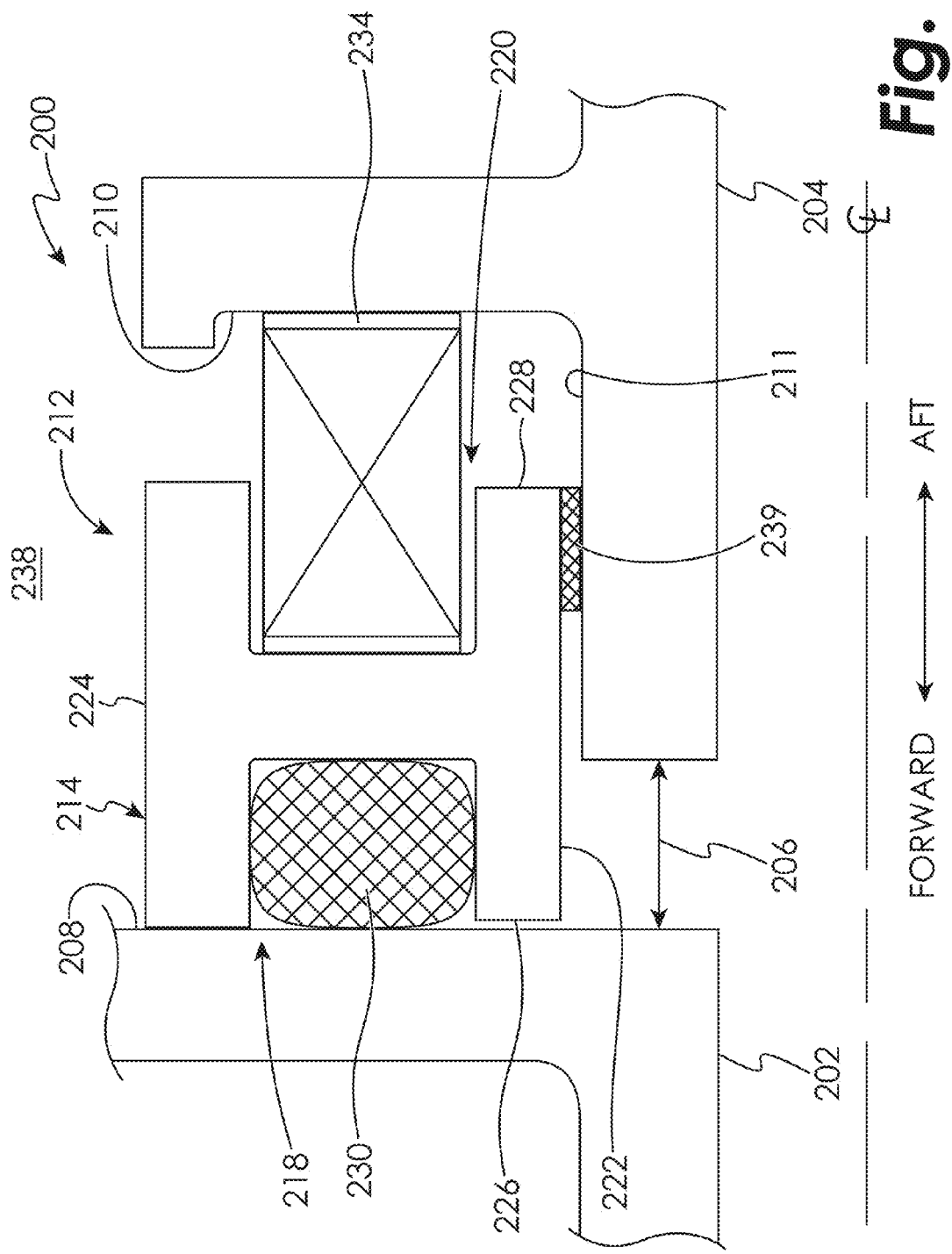
FIG. 5 is a schematic cross-sectional view of a seal and seal cavity in an embodiment.

The embodiment of FIG. 5 is similar to the embodiment of FIG. 3. A full hoop high-temperature and compliant seal 239, such as a flat fabric seal (for example, NEXTEL ceramic textile available from The 3M Company of Maplewood, Minn. USA, to name just one non-limiting example) is disposed between the inboard carrier surface 222 and the surface 211 of component 204 to partially seal stair-stepped gaps typical of segmented part interfaces of the component 204. The compliant seal 239 conforms to the surface 211 of the component 204 to provide additional sealing and to add resilience to the seal 212 in the radial direction.

Figure 6:
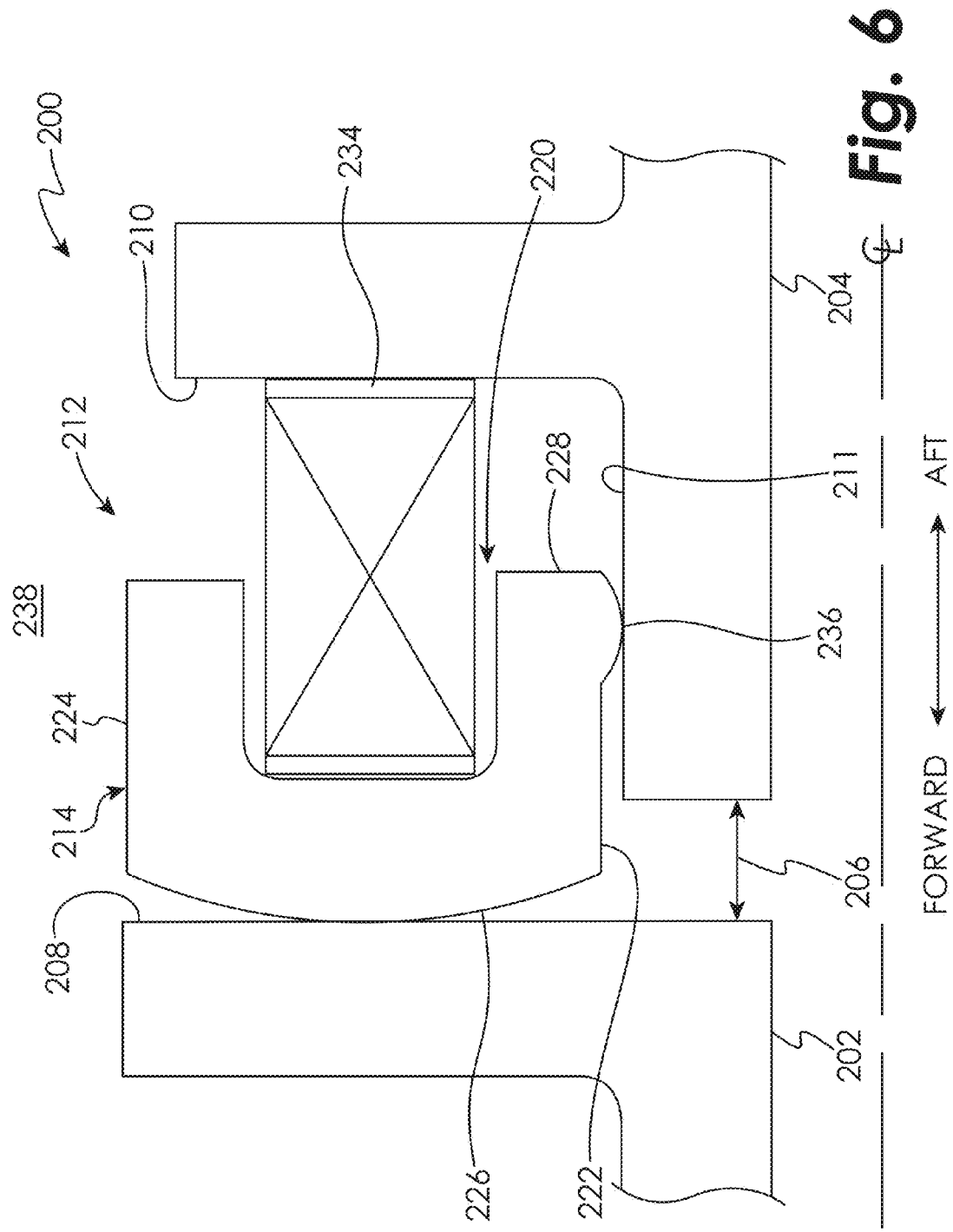
FIG. 6 is a schematic cross-sectional view of a seal and seal cavity in an embodiment.

In the embodiment of FIG. 6, the carrier 214 does not include the cavity 218 and the compliant seal 230 is omitted. The forward carrier surface 226 may be radiused to create a smaller contact footprint at the surface 208 of component 202. The radiused forward carrier surface 226 also ensures that the contact location with the surface 208 of component 202 does not change if the seal 212 were to roll slightly. Furthermore, the radiused forward carrier surface 226 also ensures that a piston area is maintained such that pressure will load the seal 212 forward. The inboard carrier surface 222 may also include a circumferential protrusion 236 to create a smaller contact footprint at the surface 211 of component 204. The seal 212 of the embodiment of FIG. 6 may be useful in applications where the stair-step offsets between adjacent segments of the component 202 are relatively small and/or where the axial design space of the cavity 200 is relatively small.

Figure 7:
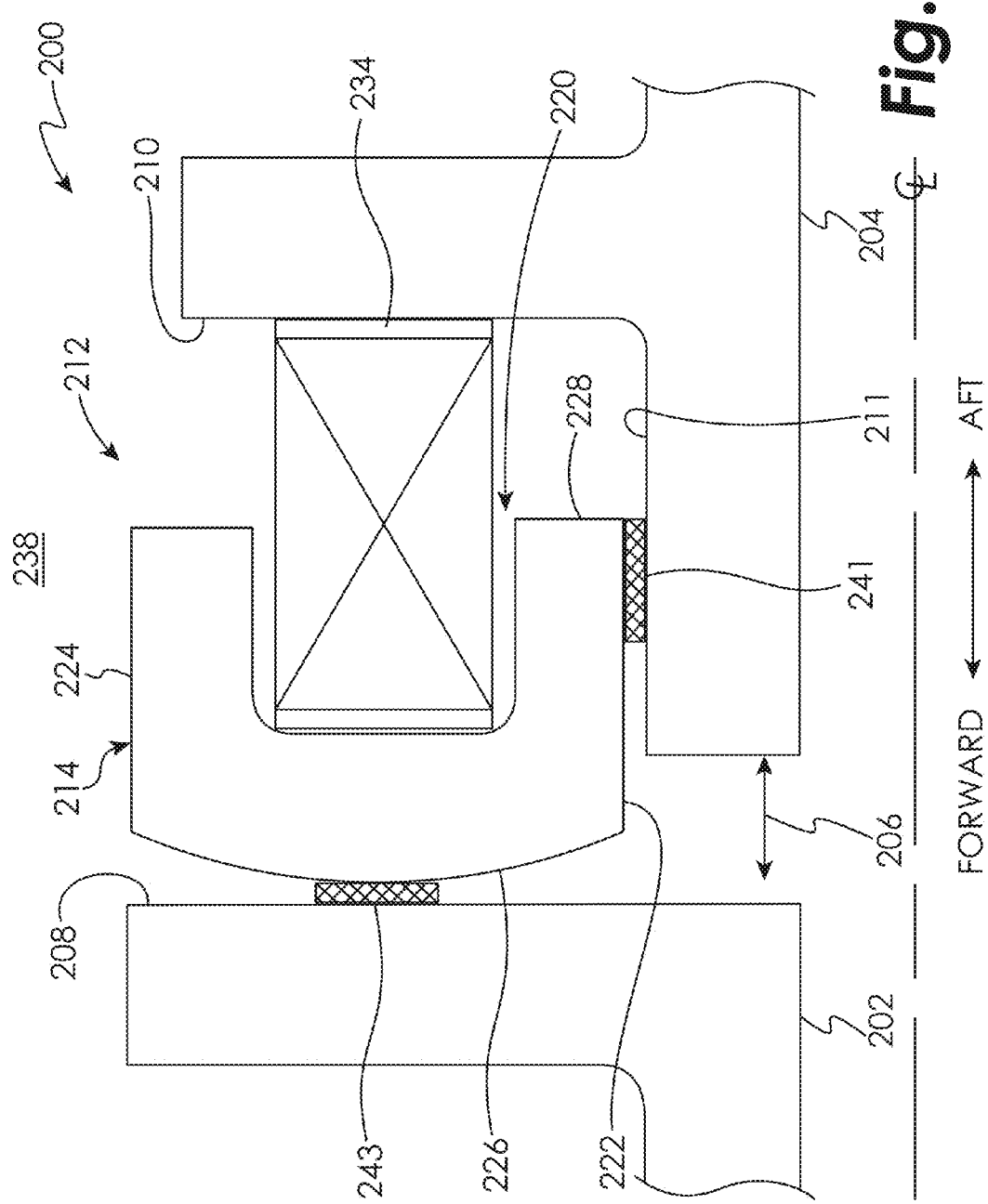
FIG. 7 is a schematic cross-sectional view of a seal and seal cavity in an embodiment.

The embodiment of FIG. 7 is similar to the embodiment of FIG. 6. A full hoop high-temperature and compliant seal 241, such as a flat fabric seal (for example, NEXTEL ceramic textile available from The 3M Company of Maplewood, Minn. USA, to name just one non-limiting example) may be disposed between the inboard carrier surface 222 and the surface 211 of component 204 to partially seal stair-stepped gaps typical of segmented part interfaces of the component 204. A second full hoop high-temperature and compliant seal 243, such as a flat fabric seal (for example, NEXTEL ceramic textile available from The 3M Company of Maplewood, Minn. USA, to name just one non-limiting example) may be disposed between the forward carrier surface 226 and the surface 208 of component 202 to partially seal stair-stepped gaps typical of segmented part interfaces of the component 202. The compliant seal 241 conforms to the surface 211 of the component 204 to provide additional sealing and to add resilience to the seal 212 in the radial direction, while the compliant seal 243 conforms to the surface 208 of the component 202 to provide additional sealing and to add resilience to the seal 212 in the axial direction.

Figure 8:
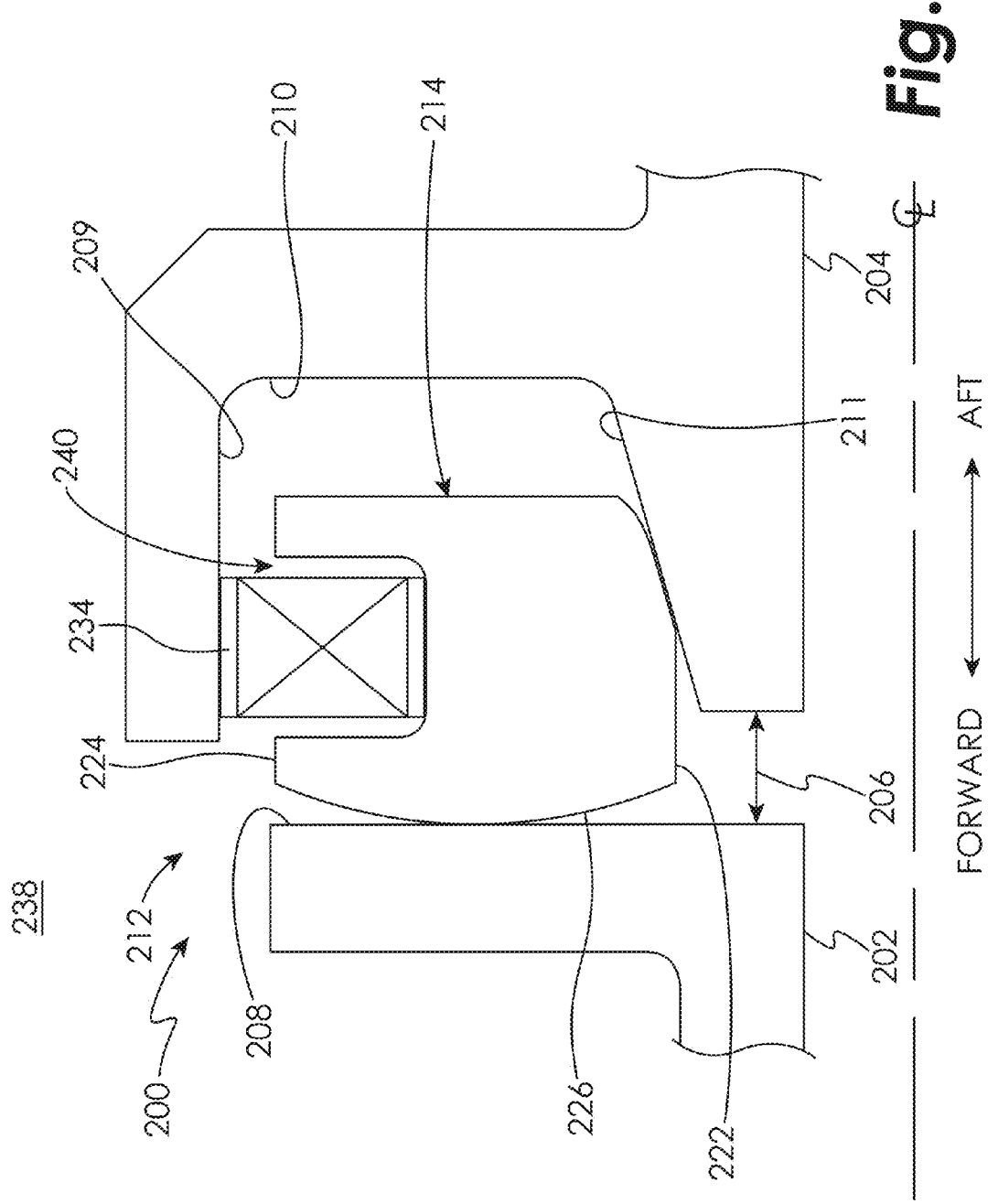
FIG. 8 is a schematic cross-sectional view of a seal and seal cavity in an embodiment.

In the embodiment of FIG. 8, the carrier 214 does not include the cavity 218 or the cavity 220 and the compliant seal 230 is omitted. A cavity 240 is formed in the outboard carrier surface 224 and the wave spring 234 is partially disposed therein and extends radially between the carrier 214 and an radial surface 209 of component 204. The forward carrier surface 226 may be radiused to create a smaller contact footprint at the surface 208 of component 202. The radiused forward carrier surface 226 also ensures that the contact location with the surface 208 of component 202 does not change if the seal 212 were to roll slightly. Furthermore, the radiused forward carrier surface 226 also ensures that a piston area is maintained such that pressure will load the seal 212 forward. At least a portion of the inboard carrier surface 222 may be radiused to create a smaller contact footprint at the surface 211 of component 204. Furthermore, the surface 211 of component 204 may comprise an at least partially ramped surface 211 that forms an angle of less than 90 degrees with the surface 208 of component 202. The wave spring 234, acting on the surface 209 of component 204, provides radially inboard loading of the carrier 214 to maintain contact between the inboard carrier surface 222 and the ramped surface 211 of component 204, while the ramped surface 211 provides axially forward loading of the carrier 214.

As the two components 202 and 204 move relative to each other in the axial and/or radial direction, the seal 212 inboard carrier surface 222 slides along the ramped surface 211 with little or no deformation, and the pressure forces acting upon the carrier 214 load the seal 212 so that the forward carrier surface 226 remains in contact with the surface 208 of component 202 and the inboard carrier surface 222 remains in contact with the ramped surface 211 of component 204 as shown. The seal 212 of the embodiment of FIG. 8 may be useful in applications where the stair-step offsets between adjacent segments of the component 202 are relatively small and/or where the axial design space of the cavity 200 is relatively small.

Figure 9:
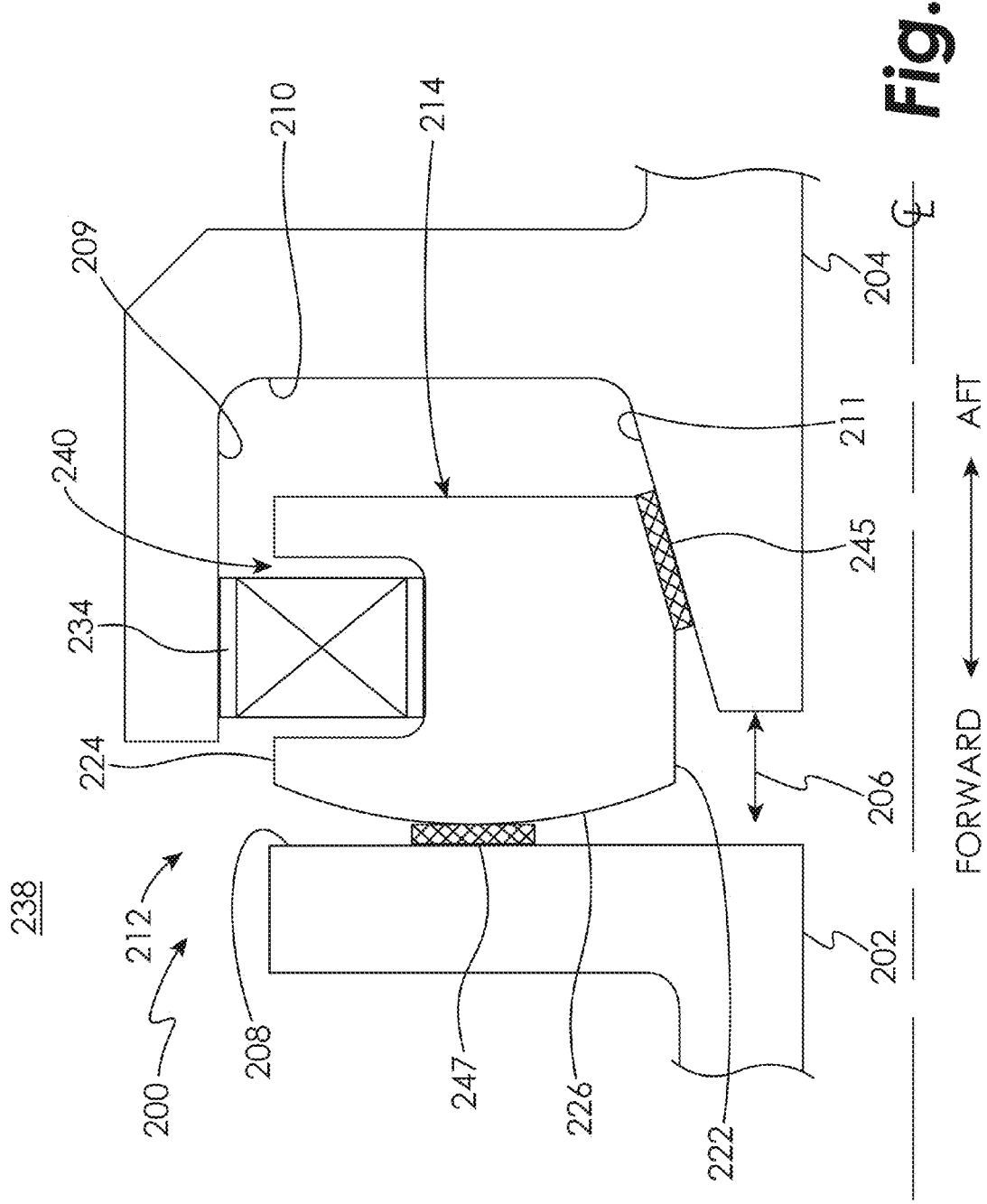
FIG. 9 is a schematic cross-sectional view of a seal and seal cavity in an embodiment.

The embodiment of FIG. 9 is similar to the embodiment of FIG. 8. A full hoop high-temperature and compliant seal 245, such as a flat fabric seal (for example, NEXTEL ceramic textile available from The 3M Company of Maplewood, Minn. USA, to name just one non-limiting example) may be disposed between the inboard carrier surface 222 and the ramped surface 211 of component 204 to partially seal stair-stepped gaps typical of segmented part interfaces of the component 204. A second full hoop high-temperature and compliant seal 247, such as a flat fabric seal (for example, NEXTEL ceramic textile available from The 3M Company of Maplewood, Minn. USA, to name just one non-limiting example) may be disposed between the forward carrier surface 226 and the surface 208 of component 202 to partially seal stair-stepped gaps typical of segmented part interfaces of the component 202. The compliant seal 245 conforms to the ramped surface 211 of the component 204 to provide additional sealing and to add resilience to the seal 212 in the radial and axial directions, while the compliant seal 247 conforms to the surface 208 of the component 202 to provide additional sealing and to add resilience to the seal 212 in the axial direction.

Figure 10:
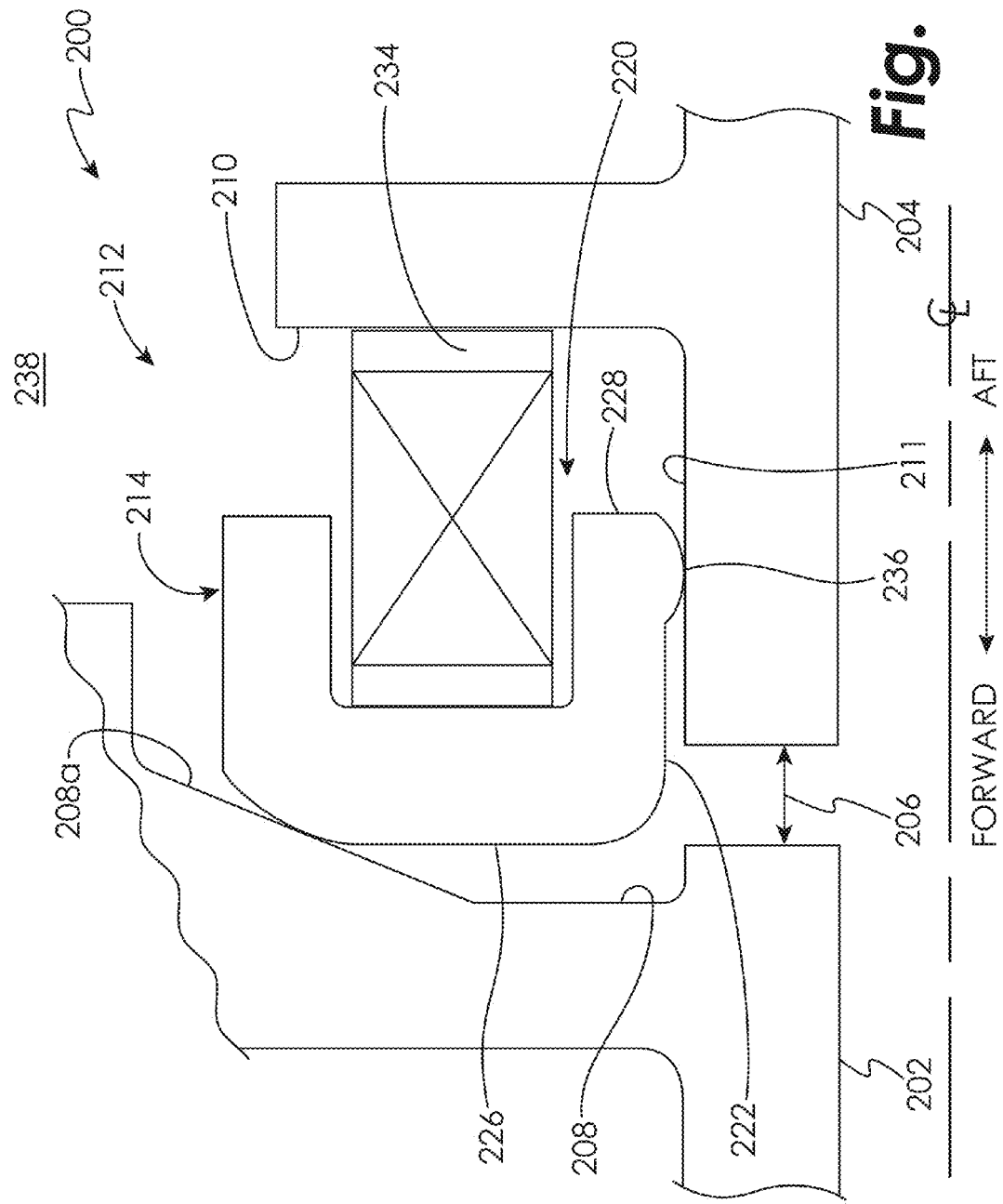
FIG. 10 is a schematic cross-sectional view of a seal and seal cavity in an embodiment.

In the embodiment of FIG. 10, the seal 212 is configured similarly to the embodiment of FIG. 6. The surface 208 of component 202 may comprise an at least partially ramped surface 208a that forms an angle of less than 90 degrees with the surface 211 of component 204. The wave spring 234, acting on the surface 210 of component 204, provides axially forward loading of the carrier 214 to maintain contact between the forward carrier surface 226 and the ramped surface 208a of component 202, while the ramped surface 208a provides radially inboard loading of the carrier 214 to maintain contact between the inboard carrier surface 222 and the surface 211 of component 204 at the protrusion 236.

Figure 11:
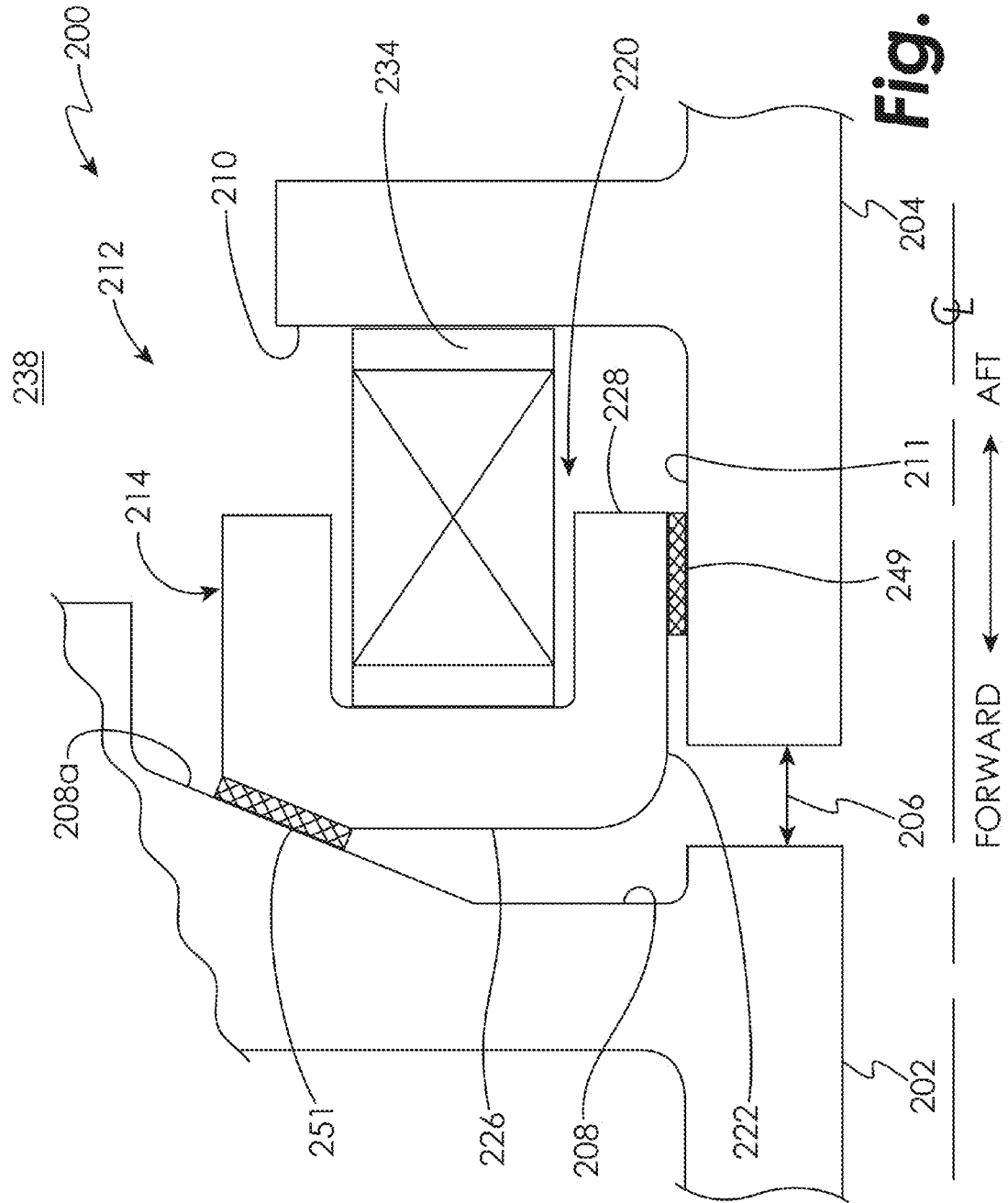
FIG. 11 is a schematic cross-sectional view of a seal and seal cavity in an embodiment.

The embodiment of FIG. 11 is similar to the embodiment of FIG. 10. A full hoop high-temperature and compliant seal 249, such as a flat fabric seal (for example, NEXTEL ceramic textile available from The 3M Company of Maplewood, Minn. USA, to name just one non-limiting example) may be disposed between the inboard carrier surface 222 and the surface 211 of component 204 to partially seal stair-stepped gaps typical of segmented part interfaces of the component 204. A second full hoop high-temperature and compliant seal 251, such as a flat fabric seal (for example, NEXTEL ceramic textile available from The 3M Company of Maplewood, Minn. USA, to name just one non-limiting example) may be disposed between the forward carrier surface 226 and the ramped surface 208a of component 202 to partially seal stair-stepped gaps typical of segmented part interfaces of the component 202. The compliant seal 247 conforms to the surface 211 of the component 204 to provide additional sealing and to add resilience to the seal 212 in the radial direction, while the compliant seal 251 conforms to the ramped surface 208a of the component 202 to provide additional sealing and to add resilience to the seal 212 in the axial and radial directions.

Figure 12:
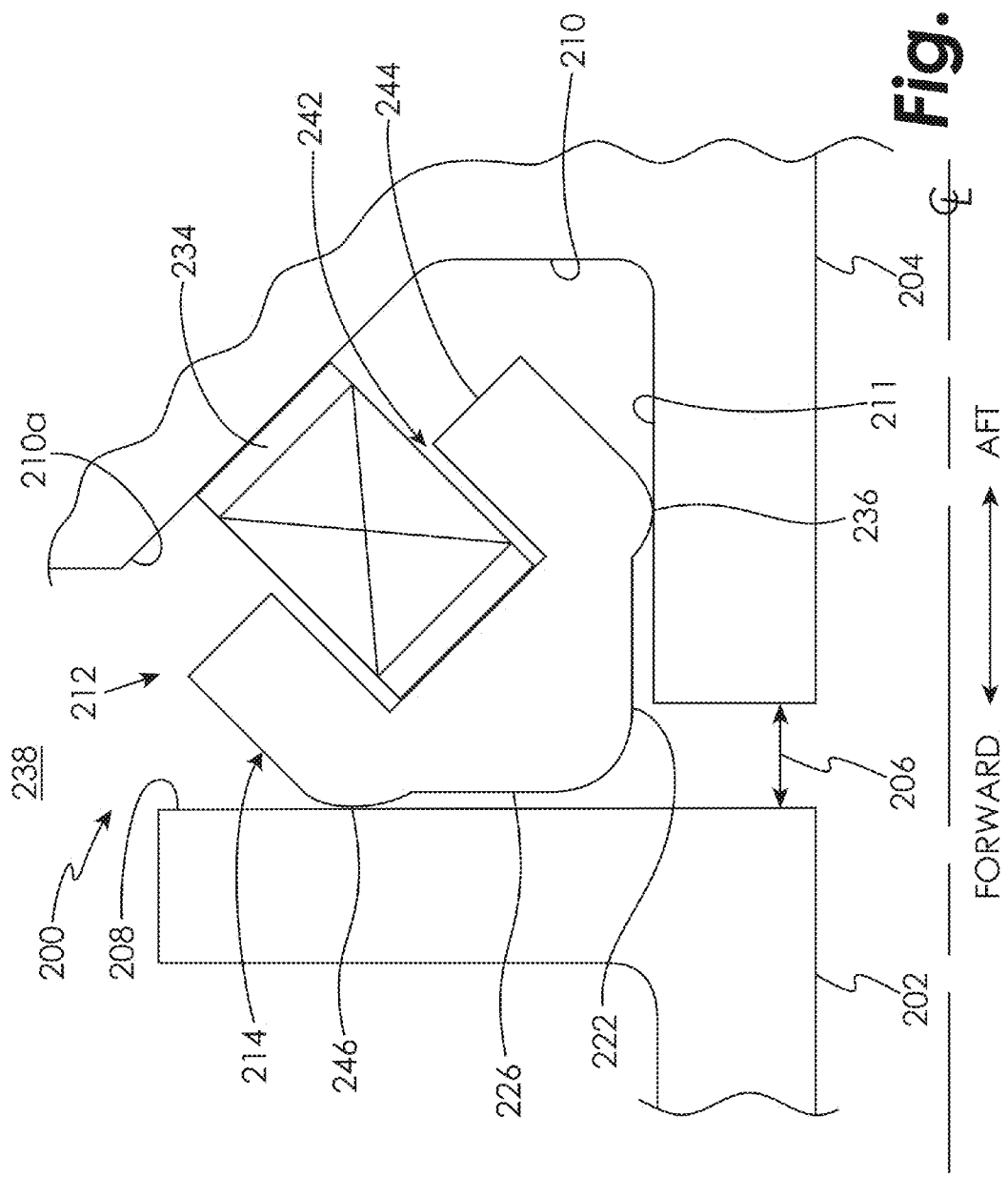
FIG. 12 is a schematic cross-sectional view of a seal and seal cavity in an embodiment.

In the embodiment of FIG. 12, the carrier 214 does not include the cavity 218 or the cavity 220 and the compliant seal 230 is omitted. A cavity 242 is formed in a frustoconical carrier surface 244 that extends both axially and radially. The wave spring 234 is partially disposed therein and extends both axially and radially between the carrier 214 and the surface 210 of component 204. At least a portion 210a of the surface 210 of component 204 comprises a frustoconical surface that extends both axially and radially. In one embodiment, an angle formed between the portion 210a of surface 210 and the surface 211 comprises substantially 45 degrees. The forward carrier surface 226 may include a circumferential protrusion 246 to create a smaller contact footprint at the surface 208 of component 202, as well as to create an axial piston area such that the pressure differential across the seal 212 causes the forward carrier surface 226 to be loaded against the surface 208 of component 202. The wave spring 234, acting on the surface 210a of component 204, provides radially inboard loading of the carrier 214 to maintain contact between the inboard carrier surface 222 and the surface 211 of component 204 at the protrusion 236. The wave spring 234 further provides axially forward loading of the carrier 214 to maintain contact between the forward carrier surface 226 and the ramped surface 208 of component 202 at the protrusion 246.

Figure 13:
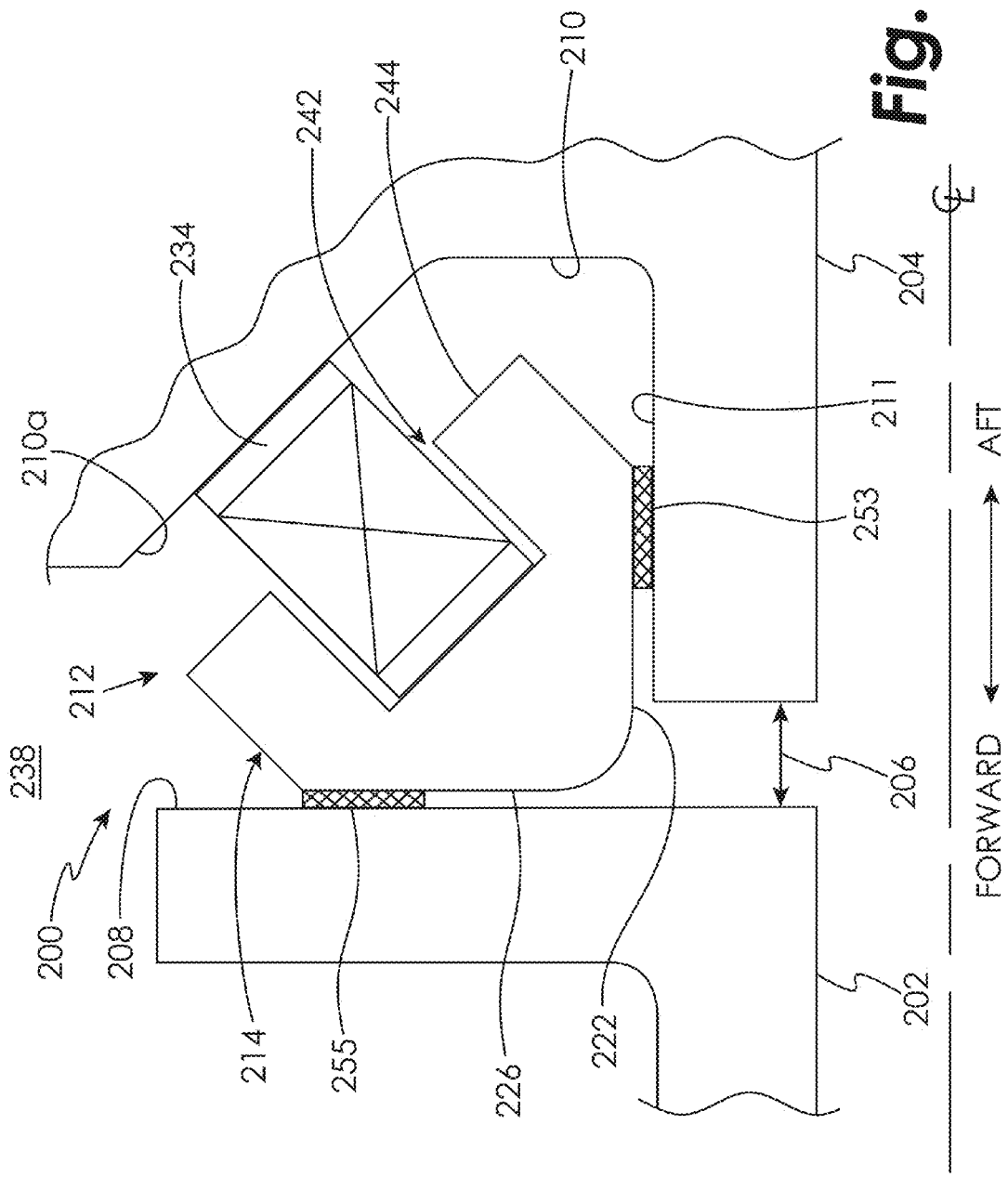
FIG. 13 is a schematic cross-sectional view of a seal and seal cavity in an embodiment.

The embodiment of FIG. 13 is similar to the embodiment of FIG. 12. A full hoop high-temperature and compliant seal 253, such as a flat fabric seal (for example, NEXTEL ceramic textile available from The 3M Company of Maplewood, Minn. USA, to name just one non-limiting example) may be disposed between the inboard carrier surface 222 and the surface 211 of component 204 to partially seal stair-stepped gaps typical of segmented part interfaces of the component 204. A second full hoop high-temperature and compliant seal 255, such as a flat fabric seal (for example, NEXTEL ceramic textile available from The 3M Company of Maplewood, Minn. USA, to name just one non-limiting example) may be disposed between the forward carrier surface 226 and the surface 208 of component 202 to partially seal stair-stepped gaps typical of segmented part interfaces of the component 202. The compliant seal 253 conforms to the surface 211 of the component 204 to provide additional sealing and to add resilience to the seal 212 in the radial direction, while the compliant seal 255 conforms to the surface 208 of the component 202 to provide additional sealing and to add resilience to the seal 212 in the axial directions.

Compared to the seal 108, the wave spring 234 exhibits improved resilience within the same design space since the wave spring 234 can be configured to have a much lower spring rate and can accommodate significantly more deflection. The compliant seals of the various embodiments add further resilience. The carrier 214 is not deflected as the components 202 and 204 move relative to each other during engine assembly and engine operation, which is beneficial because the carrier 214 can be made from a lower strength and thicker, more lubricious material that may be lower cost, have higher temperature capability, be more manufacturable, more wear-resistant, and/or more wear tolerant. The seal 212 in the embodiments where a compliant material is used against segmented parts offers potentially improved sealing. Additionally, the seal 212 is less susceptible to distortion or breakage, which can cause leakage of gas past the seal 212 and/or liberation of the seal. Furthermore, the seal 212 exhibits improved vibration tolerance due to friction damping.

While the disclosure has been illustrated and described in detail in the drawings and foregoing description, the same is to be considered as illustrative and not restrictive in character, it being understood that only certain embodiments have been shown and described and that all changes and modifications that come within the scope of the disclosure are desired to be protected.

What is claimed:

1. A seal for sealing a space defined by first and second adjacent components disposed about a centerline, the seal comprising:
    a carrier, comprising:
        an inboard carrier surface;
        an outboard carrier surface disposed radially outboard from the inboard carrier surface;
        a forward carrier surface; an aft carrier surface; and
        a first cavity disposed in one of the outboard carrier surface, and the aft carrier surface; and
        a second cavity disposed in the forward carrier surface;
    a wave spring at least partially disposed in the first cavity and extending from the carrier to the second component operative to bias the carrier toward the first component; and
    a first compliant seal at least partially disposed in the second cavity and extending between the carrier and the first component, the wave spring configured to urge the first compliant seal into engagement with the first component.

2. The seal of claim 1, wherein the carrier is split at one circumferential location.

3. The seal of claim 2, wherein an inner diameter of the carrier in a free state is less than an outer diameter of the space.

4. The seal of claim 1, wherein the first compliant seal comprises one of a woven ceramic rope seal, a braided ceramic rope seal, and a ceramic textile.

5. The seal of claim 1, further comprising a second compliant seal disposed between the inboard carrier surface and the second component.

6. The seal of claim 1, wherein the seal is formed from a material selected from one of a high-temperature metal alloy, a high-temperature ceramic material, and a high-temperature ceramic composite, or a combination of two or more of a high-temperature metal alloy, a high-temperature ceramic material and a high-temperature ceramic composite.

7. The seal of claim 6, wherein the inboard carrier surface comprises a first circumferential protrusion in contact with the second component.

8. The seal of claim 6, wherein:
the first component includes a ramped first surface that forms an angle of less than 90 degrees with a second surface of the second component; and
the forward carrier surface is in contact with the ramped first surface.

9. The seal of claim 6, wherein the first component includes a ramped first surface that forms an angle of less than 90 degrees with a second surface of the second component, the seal further comprising:
a second compliant seal disposed between the inboard carrier surface and the second component; and
a third compliant seal disposed between the forward carrier surface and the ramped first surface.

10. The seal of claim 9, further comprising:
a second compliant seal disposed between the inboard carrier surface and the second component; and
a third compliant seal disposed between the forward carrier surface and the first component.

11. The seal of claim 1, wherein the forward carrier surface is at least partially radiused.

12. The seal of claim 11, further comprising:
a second compliant seal disposed between the inboard carrier surface and the second component; and
a third compliant seal disposed between the forward carrier surface and the first component.

13. The seal of claim 12, wherein the second component includes a ramped first surface that forms an angle of less than 90 degrees with a second surface of the first component.

14. The seal of claim 1, wherein:
the first cavity is disposed in the outboard carrier surface; and the wave spring radially biases the carrier.

15. The seal of claim 14, further comprising:
a second compliant seal disposed between the inboard carrier surface and the ramped first surface; and
a third compliant seal disposed between the forward carrier surface and the first component.

16. The seal of claim 1, wherein:
the second component includes a frustoconical component surface that extends both axially and radially;
the outboard carrier surface comprises a frustoconical carrier surface that extends both axially and radially;
the first cavity is disposed in the frustoconical carrier surface;
the wave spring extends between the first cavity and the frustoconical component surface; the wave spring axially loads the carrier against the first component; and
the wave spring radially loads the carrier against the second component.

17. A system, comprising:
a first component including a first surface;
a second component including a second surface, the second component disposed adjacent the first component and defining a seal cavity therebetween;
wherein the first and second components are disposed about an axial centerline; and a seal disposed in the seal cavity, the seal including:
a carrier, comprising:
an inboard carrier surface;
an outboard carrier surface disposed radially outboard from the inboard carrier surface;
a forward carrier surface;
an aft carrier surface;
a first cavity disposed in one of the outboard carrier surface, and the aft carrier surface; and
a second cavity disposed in the forward carrier surface;
a wave spring at least partially disposed in the first cavity and from the carrier to the second component and operative to bias the carrier toward the first component; and
a first compliant seal at least partially disposed in the second cavity and extending between the carrier and the first component, the wave spring configured to urge the first compliant seal into engagement with the first component.

18. The system of claim 17, wherein the forward carrier surface is at least partially radiused.

19. The system of claim 17, wherein:
the second component includes a frustoconical component surface that extends both axially and radially;
the outboard carrier surface comprises a frustoconical carrier surface that extends both axially and radially;
the first cavity is disposed in the frustoconical carrier surface;
the wave spring extends between the first cavity and the frustoconical component surface; the wave spring axially loads the carrier against the first component; and
the wave spring radially loads the carrier against the second component.

* * * * *